UNITED STATES PATENT OFFICE.

THOMAS H. DURRANS, OF OXFORD, ENGLAND, ASSIGNOR TO A. BOAKE, ROBERTS & CO., LIMITED, OF STRATFORD, LONDON, ENGLAND.

PROCESS FOR THE PRODUCTION OF DIMETHYL SULFATE.

1,317,648.  Specification of Letters Patent.  Patented Sept. 30, 1919.

No Drawing.  Application filed July 1, 1918.  Serial No. 242,919.

*To all whom it may concern:*

Be it known that I, THOMAS HAROLD DURRANS, B. Sc., F. I. C., a subject of the King of Great Britain, residing in Oxford, England, at 245 Woodstock road, have invented certain new and useful Improvements in Processes for the Production of Dimethyl Sulfate, of which the following is a specification.

This invention relates to an improved process for the preparation of dimethyl sulfate.

Broadly defined the invention consists in the treatment of methyl alcohol with sulfur dioxid and chlorin, either simultaneously or successively with the consequent formation of di-methyl sulfate and other similar bodies. The method is distinct from those involving the use of sulfuryl chlorid (*c. f.* *Journal für praktische Chemie*, vol. 15, series 2, page 23, (1877).

The reaction takes place more or less as indicated by the following chemical equations:—

(1) 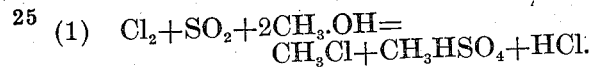
$$Cl_2 + SO_2 + 2CH_3.OH = CH_3Cl + CH_3HSO_4 + HCl.$$

(2) 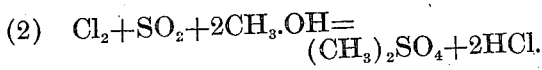
$$Cl_2 + SO_2 + 2CH_3.OH = (CH_3)_2SO_4 + 2HCl.$$

Both the reactions indicated by the equations (1) and (2) probably take place during the treatment of methyl alcohol with chlorin and sulfur dioxid, and if the liquid which results be distilled a further reaction takes place and the methyl hydrogen sulfate which has been formed in that part of the reaction indicated by equation (1) is transformed into di-methyl sulfate and sulfuric acid.

This further reaction is probably represented by the equation:—

(3) 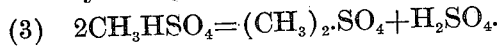
$$2CH_3HSO_4 = (CH_3)_2.SO_4 + H_2SO_4.$$

The di-methyl sulfate $(CH_3)_2.SO_4$ can be distilled off from the sulfuric acid if the temperature and pressure be suitably chosen.

By these reactions there can be obtained di-methyl sulfate, methyl hydrogen sulfate, and methyl chlorid, or mixtures of these. All are valuable methylating (alkylating) agents.

Yields of well over 50% by weight of di-methyl sulfate are readily obtained, which in conjunction with methyl chlorid also produced, represents a yield approaching that possible theoretically.

It is relatively unimportant as to the manner in which methyl alcohol be treated with the chlorin and the sulfur dioxid with the exception that if the chlorin be allowed to be in excess at any time during the operation or be passed in too rapidly there is a tendency for it to produce undesirable side products due to substitution or oxidation; it is therefore advisable to have the sulfur dioxid always in slight excess.

During the absorption of the gases heat is produced and it is better to cool the mixture although this is not absolutely necessary.

After treating the alcohol with chlorin and sulfur dioxid the products of the reaction may be recovered by distillation, first at ordinary pressure, until the dissolved methyl chlorid has distilled off, and then under diminished pressure in order to obtain the di-methyl sulfate, or the mixture may be used directly as an alkylating (methylating) agent. The greater part of the methyl chlorid will have been carried off by the excess of sulfur dioxid used and by the hydrogen chlorid produced by the reaction. It can be isolated therefrom by carefully washing the gases with water alone or by washing with water and alkaline hydroxid solution, or by contact with solid alkalis in order to remove the sulfur dioxid and hydrogen chlorid and it may be condensed to a liquid by appropriate treatment with cold or pressure, or a combination of these as is well known.

In order to make the process more clear the following is given as an example of the manner in which it may be carried out.

Into 32 parts weight of anhydrous methyl alcohol is passed about 35 parts weight of chlorin and about the same weight of sulfur dioxid, the latter thus being in excess of that required according to the equations (1) and (2). It is best to partially saturate the methyl alcohol with some of the sulfur dioxid before adding the chlorin; thus, for example, the excess over the theory of the sulfur dioxid (3 parts weight) may be added at the start and maintained throughout the addition of the mixture of chlorin and sulfur dioxid.

When the requisite amounts of chlorin and sulfur dioxid have been added the product may be heated on a water bath in order to drive off the excess of sulfur dioxid, the hydrogen chlorid and the methyl chlorid remaining.

The product thus left behind can be used without further treatment or di-methyl sulfate may be obtained by submitting the product to distillation under diminished pressure in the usual manner, the sulfuric acid which has been formed being allowed to remain behind.

The methyl chlorid can be isolated from the other gaseous products of the reactions by passing them through sodium hydroxid solution or through a tower filled with slaked lime, the alkali absorbing the sulfur dioxid and the hydrogen chlorid, while the methyl chlorid passes on. The methyl chlorid may be used in its gaseous state or may be condensed to a liquid, by means of cold or pressure or a combination of these.

The above process is given as an example and it is not intended thereby to limit it to the exact operations described.

Claims:

1. A process for the preparation of di-methyl sulfate, methyl hydrogen sulfate, and methyl chlorid, by treating methyl alcohol with sulfur dioxid and chlorin, the quantities of chlorin and sulfur dioxid being approximately in the proportion of one molecular proportion of each for every two molecular proportions of methyl alcohol.

2. A process for the preparation of di-methyl sulfate, methyl hydrogen sulfate, and methyl chlorid, by treating methyl alcohol first with sulfur dioxid then with chlorin, the quantities of chlorin and of sulfur dioxid being approximately in the proportion of one molecular proportion of each for every two molecular proportions of methyl alcohol.

3. A process for the preparation of di-methyl sulfate, methyl hydrogen sulfate and methyl chlorid, in which methyl alcohol is treated with sulfur dioxid and chlorin, the quantities of chlorin and sulfur dioxid being approximately in the proportion of one molecular proportion of each for every two molecular proportions of methyl alcohol, but with a slight excess of sulfur dioxid always in the reaction chamber for the purpose of preventing undesirable side products due to substitution or oxidation.

In testimony whereof I affix my signature in the presence of two witnesses.

THOS. H. DURRANS.

Witnesses:
FRANCIS WHEMS,
GEORGE BELFORD.